US012404094B1

(12) United States Patent
Mackintosh et al.

(10) Patent No.: US 12,404,094 B1
(45) Date of Patent: Sep. 2, 2025

(54) RUGGEDIZED GROUND CATCH COVER FOR CONSTRUCTION DEBRIS

(71) Applicants: Eric Mackintosh, Tyler, TX (US); Heath Hicks, Tyler, TX (US)

(72) Inventors: Eric Mackintosh, Tyler, TX (US); Heath Hicks, Tyler, TX (US)

( * ) Notice: Subject to any disclaimer, the term of this patent is extended or adjusted under 35 U.S.C. 154(b) by 71 days.

(21) Appl. No.: 18/229,372

(22) Filed: Aug. 2, 2023

Related U.S. Application Data

(60) Provisional application No. 63/394,796, filed on Aug. 3, 2022.

(51) Int. Cl.
*B65F 1/00* (2006.01)

(52) U.S. Cl.
CPC .................................... *B65F 1/002* (2013.01)

(58) Field of Classification Search
CPC ................ B65F 1/002; B65F 2240/138; B65F 2240/118
USPC ......................................................... 383/6, 4
See application file for complete search history.

(56) References Cited

U.S. PATENT DOCUMENTS 11,470,931 B2 * 10/2022 Davis ........................ A45F 4/02
2006/0232082 A1 * 10/2006 Tiura ........................ B65F 1/10 294/214
2007/0290464 A1 * 12/2007 Mastromatto .......... A01G 20/43 383/127
2008/0115853 A1 * 5/2008 Snipes .................. B65F 1/0006 383/7
2009/0173460 A1 * 7/2009 Handwerker ........... E04G 21/24 160/351
2012/0151679 A1 * 6/2012 Kenalty ................. A61G 1/013 5/628
2018/0242718 A1 * 8/2018 Hanson ..................... A45F 3/04
2020/0354959 A1 11/2020 Hicks et al.
2021/0321754 A1 * 10/2021 Barber ................. A45C 13/002
2022/0048706 A1 * 2/2022 Hermosillo Magallenes .............. B65F 1/0006

* cited by examiner

*Primary Examiner* — Jes F Pascua
(74) *Attorney, Agent, or Firm* — Standley Law Group LLP; F. Michael Speed

(57) ABSTRACT

A ruggedized material collection device and related methods are provided. The ground catch device includes a primary catch area defining a perimeter, a ruggedized portion located within the perimeter, and straps. Each strap is attached to the primary catch area and at least some of the straps extend beyond the perimeter when the device is laid flat. Material may be deposited within the primary catch area which is wrapped and preferably secured to itself with buckles. Some of the straps, preferably with grab handles, are used to drag the wrapped materials to another location, with the ruggedized portion acting as abrasion protection. In other embodiments, rigid skids are utilized.

18 Claims, 9 Drawing Sheets

3/8

7/8

RUGGEDIZED GROUND CATCH COVER FOR CONSTRUCTION DEBRIS

CROSS-REFERENCE TO RELATED APPLICATIONS

This application claims the benefit of U.S. provisional patent application Ser. No. 63/394,796 filed Aug. 3, 2022, the disclosures of which are hereby incorporated by reference as if fully restated herein.

TECHNICAL FIELD

Exemplary embodiments relate generally to a ground catch cover, such as for capturing construction debris, such as roofing materials, with ruggedization features skid protection, as well as systems and methods related to the same.

BACKGROUND AND SUMMARY OF THE INVENTION

In certain construction jobs, such as roofing, tarps or nets are sometimes placed on the ground and utilized to capture debris, such as roofing debris. An example is provided in US Pub. No. 2020/0354959 published Nov. 12, 2020. These ground tarps or net are also used to protect ground objects, such as lawns, flowers, mulch beds, bushes, small trees, and the like. These ground tarps or nets may be subject to marring, tearing, or other general wear and tear from use, especially when repeatedly drug over rough or uneven surfaces, such as but not limited to, sidewalks, driveways, pavers, decks, patios, walkways, gravel, dirt, rocks, construction tools, construction materials, or the like. Additionally, or alternatively, despite incorporating grab handles for ease of handling and/or folding, these ground tarps or nets may be difficult to handle or secure.

A ground-based catch net or tarp (hereinafter also the "ground catch") with ruggedization is provided. The ground catch may comprise a primary catch area. The primary catch area may comprise a solid material and/or netting. The solid material may comprise, for example without limitation, tarpaulin or other fully or partially weatherproof material. The netting may, in exemplary embodiments without limitation, be sized or otherwise configured to capture roofing or other construction debris. The netting may allow wind and water to pass therethrough. The ground catch may comprise one or more skid protectors located at the primary catch area. The skid protectors may comprise one or more plates, members, combinations thereof, or the like. The skid protectors may protect the ground catch, particularly when dragged over rough or uneven surfaces of job sites, such as to a dumpster so that captured debris can be deposited. The ground catch may include handles, such as spaced apart along some or all of an outer perimeter thereof.

Alternatively, or additionally, a ruggedization portion may be provided at the primary catch area. The ruggedization portion may comprise one or more ruggedized portions of material provided over a portion of the primary catch area. The ruggedized portion may serve as some or all of the skid protection and/or may provide additional skid protection. The material of the ruggedization portion may be the same or different material as the primary catch area. Preferably, the ruggedization portion comprises a solid material, such as tarpaulin.

A number of straps may be provided. In exemplary embodiments, a first and second set of one or more such straps may be provided at a first and second opposing sides of the primary catch area, which may be substantially rectangular in shape. The first and second set of straps may comprise complementary male and female buckle components for mating, such as when the ground catch is folded. A third set of one or more straps may be provided at a third side of the primary catch area and may extend between, and preferably be sewn to, the primary catch area and the ruggedization portion of material. While the first and second set of straps may extend beyond the primary catch area when the ground catch is laid flat, the third set of straps may extend within a perimeter of the primary catch area when the ground catch is laid flat. The third set of straps may comprise spaced apart male and female buckle components for mating when the ground catch is folded. In this way, the third set of straps may connect to themselves. The third set of straps may also include loop style grab handles, though any of the straps may include grab handles of any kind.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
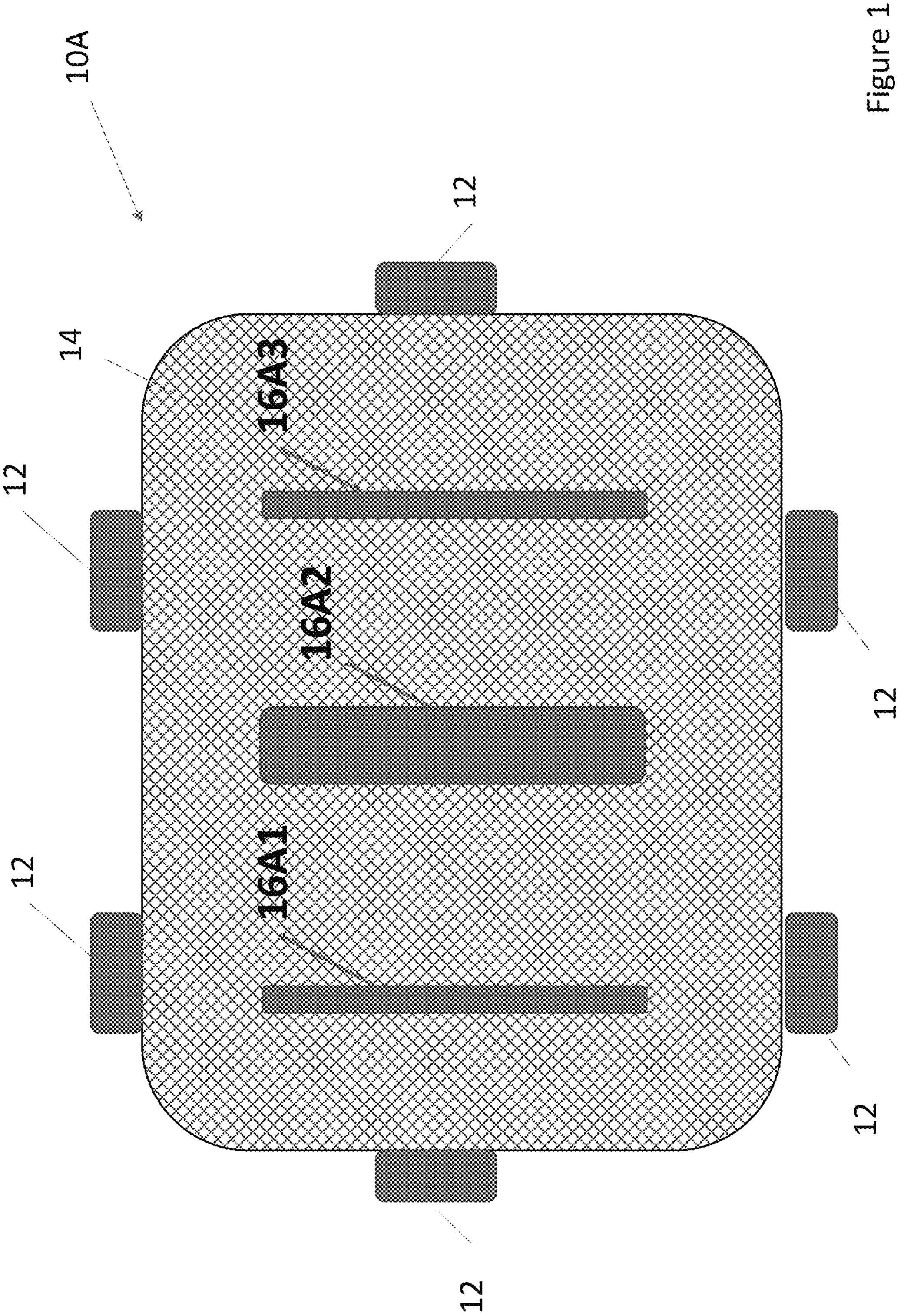
FIG. 1 is bottom plan view of an exemplary ground catch with skid protection.

FIG. 1 illustrates an exemplary ground catch 10A. The ground catch 10A may comprise a primary catch area 14. The primary catch area 14 may be flexible, such as to permit folding. The primary catch area 14 may comprise a single or multiple layers. The primary catch area 14 may comprise netting. The netting may be sized or otherwise configured to capture at least certain roofing and/or construction debris while permitting air and/or water to travel therethrough. The netting may make the ground catch 10A relatively lighter and/or easier to fold, such as for transportation or storage. The netting may also permit airflow and/or reduce heat experienced at grass or other plants located below the ground catch 10A, reducing damage to the same. The netting, in exemplary embodiments, without limitation, may provide openings of less than ¼" in size, though any size and/or type of netting may be utilized. The netting may comprise one or multiple layers or portions, such as with the same or various size and/or shape apertures. The netting may assist with capturing particularly smaller debris, such as fasteners. However, in other exemplary embodiments, some or all of the primary catch area 14 may comprise a solid material, such as but not limited to, canvas or tarpaulin. This may permit capture of additional materials.

The ground catch 10 and/or the primary catch area 14 may be substantially rectangular in shape, though any size or shape ground catch 10 and/or primary catch area 14 may be utilized.

One or more handles 12 may be provided about a perimeter of the ground catch 10A. The handles 12 may be spaced apart from one another and may be provided at some or all sides of the primary catch area 14. The handles 12 may comprise fabric, metal, plastic, or the like. The handles 12 may comprise one or more loops for a user to grab and/or manipulate. The handles 12 may be permanently affixed to the primary catch area 14, such as by sewing or adhesive. Any number and/or arrangement of the handles 12 may be provided. Handles 12 may alternatively or additionally be provided interior to the primary catch area 14. The handles 12 may be used as grab points for folding, hauling, dumping, combination thereof, or the like.

One or more skids 16A may be provided at the ground catch 10, preferably at a bottom surface of the primary catch area 14. The skids 16A1, 16A2, 16A3 may be provided along a crosswise dimension of the ground catch 10A. However, the skids 16A may be provided in any orientation, including along a lengthwise dimension of the ground catch 10A, by way of non-limiting example. Any number of skids 16A may be provided in any arrangement. The skids 16A may be spaced apart from one another, in the same or different spacing.

Figure 2:
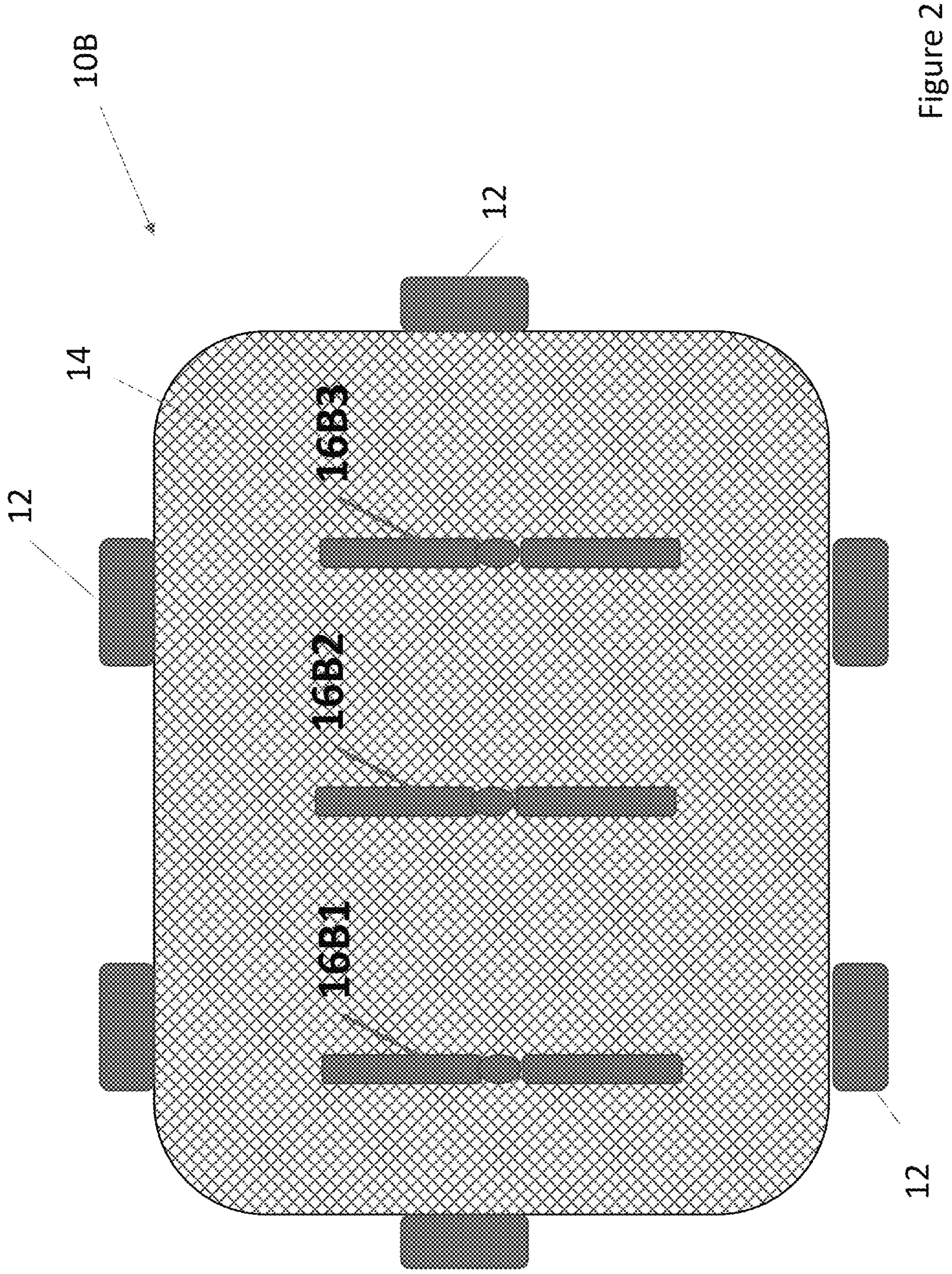
FIG. 2 is a bottom plan view of another exemplary embodiment of the ground catch with skid protection.

FIG. 2 illustrates another exemplary embodiment of the ground catch 10B. The skids 16B may comprise multiple sections which are flexible and/or permit hinging or other movement, such as with the primary catch area 14. This may permit folding of the ground catch 10B, such as for storage or transportation. This may, alternatively or additionally, permit flexibility of movement over uneven surfaces.

Figure 3:
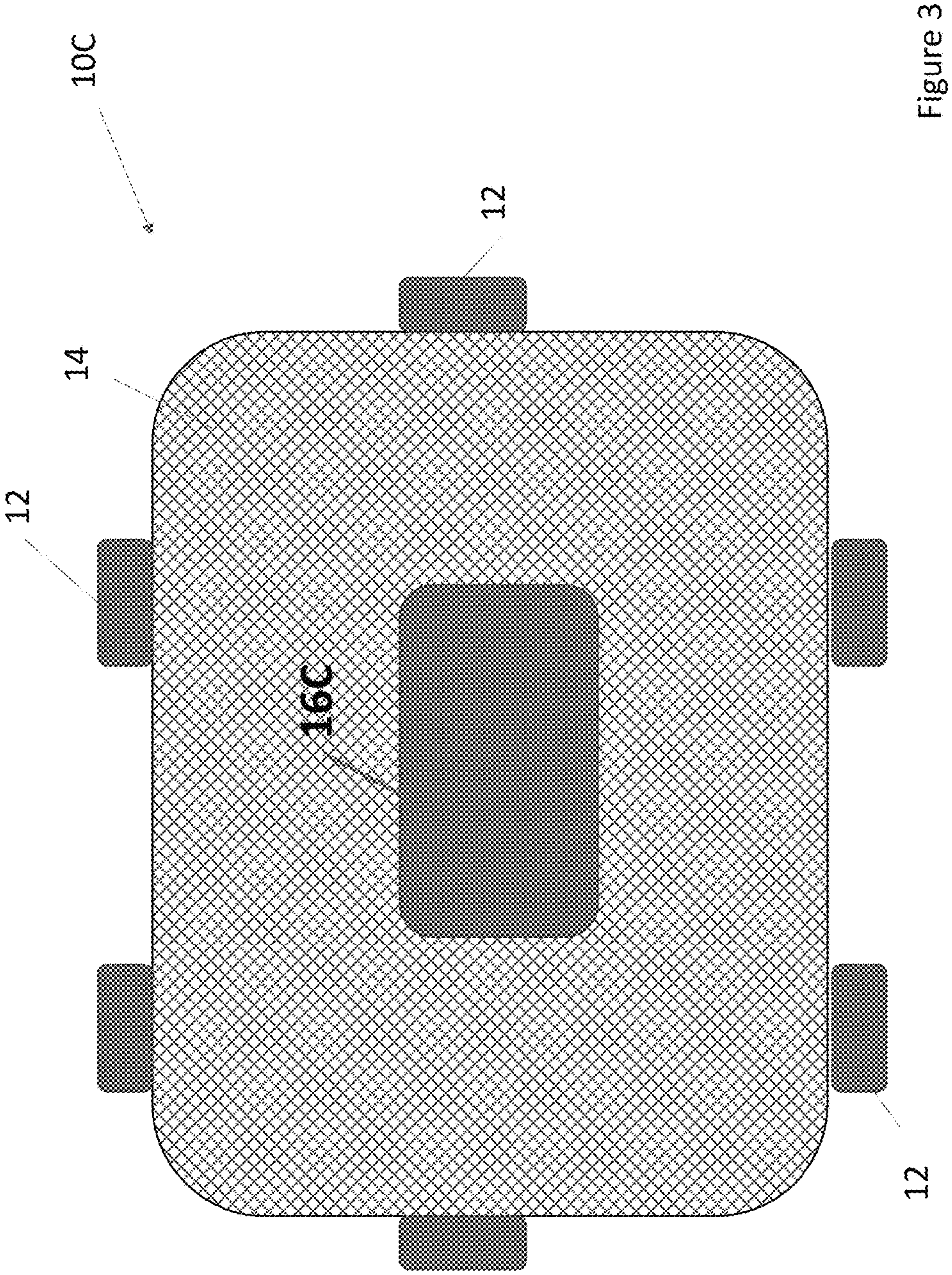
FIG. 3 is a bottom plan view of another exemplary embodiment of the ground catch with skid protection.

FIG. 3 illustrates another exemplary embodiment of the ground catch 10C. The skids 16C may comprise one or more plates or panels. Multiple plates or panels of various size or shape may be provided at various positions.

Figure 4:
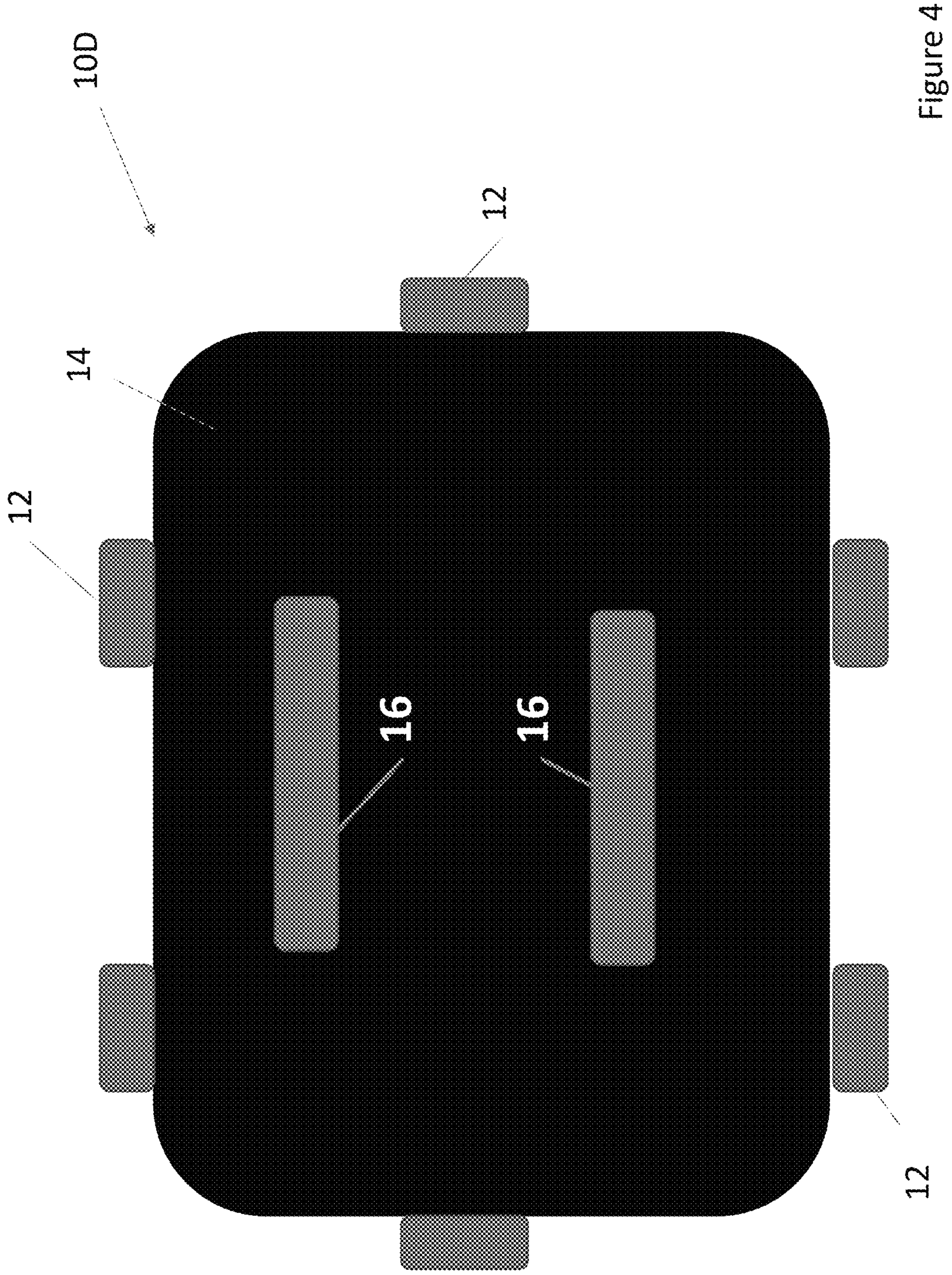
FIG. 4 is a bottom plan view of another exemplary embodiment of the ground catch with skid protection.

FIG. 4 illustrates another exemplary embodiment of the ground catch 10D. The primary catch area 14 may comprise a solid material, such as cloth, tarpaulin, nylon, polymers, combinations thereof, or the like. The skids 16 may extend along a lengthwise dimension of the ground catch 10D, by way of non-limiting example, though other orientations may be utilized. Any number and type of skids 16 may be utilized.

Figures 5, 6, 7, 8:
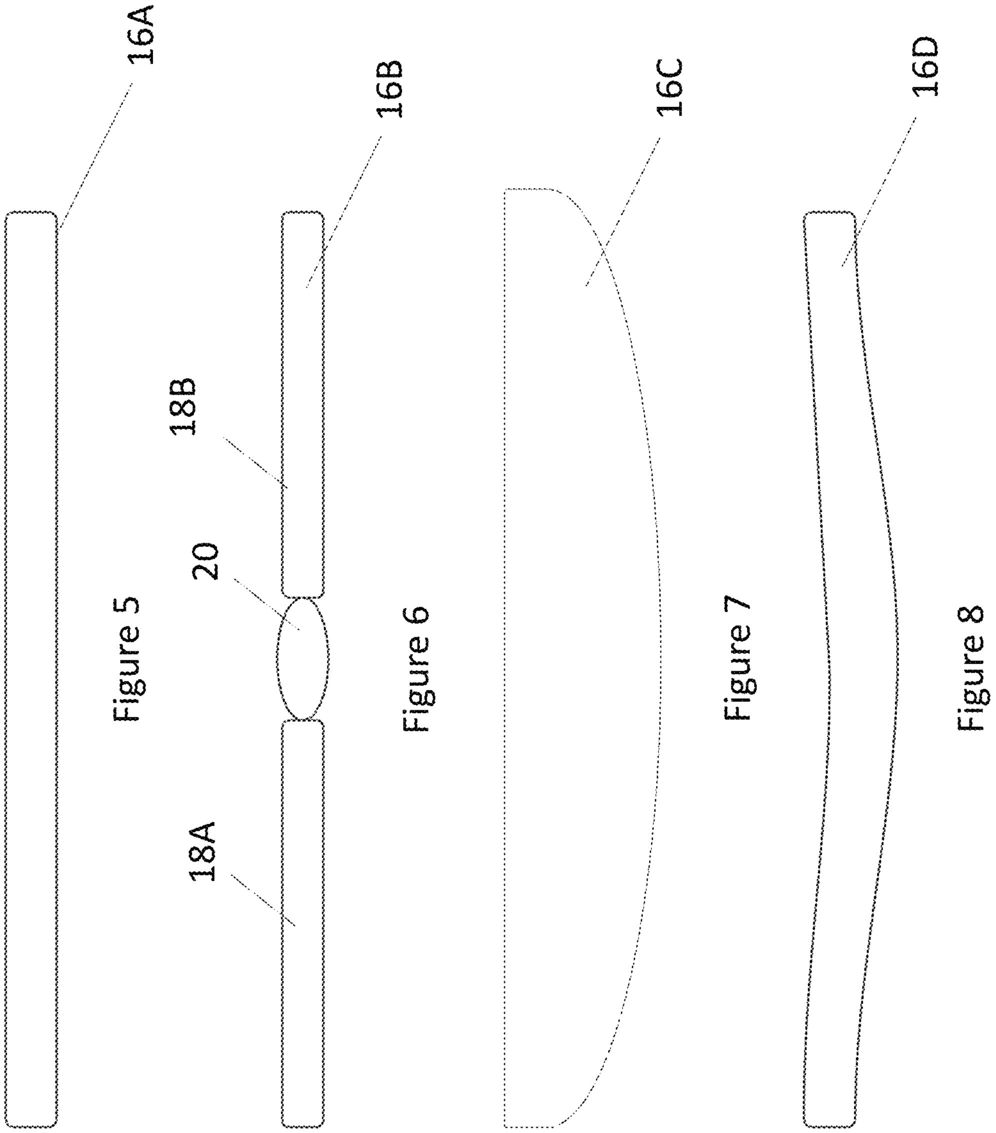
FIG. 5 is a side elevation view of an exemplary skid for the ground catch of FIGS. 1-4.
FIG. 6 is a side elevation view of another exemplary embodiment of the skid for the ground catch of FIGS. 1-4.
FIG. 7 is a side elevation view of another exemplary embodiment of the skid for the ground catch of FIGS. 1-4.
FIG. 8 is a side elevation view of another exemplary embodiment of the skid for the ground catch of FIGS. 1-4.
Figure 9:
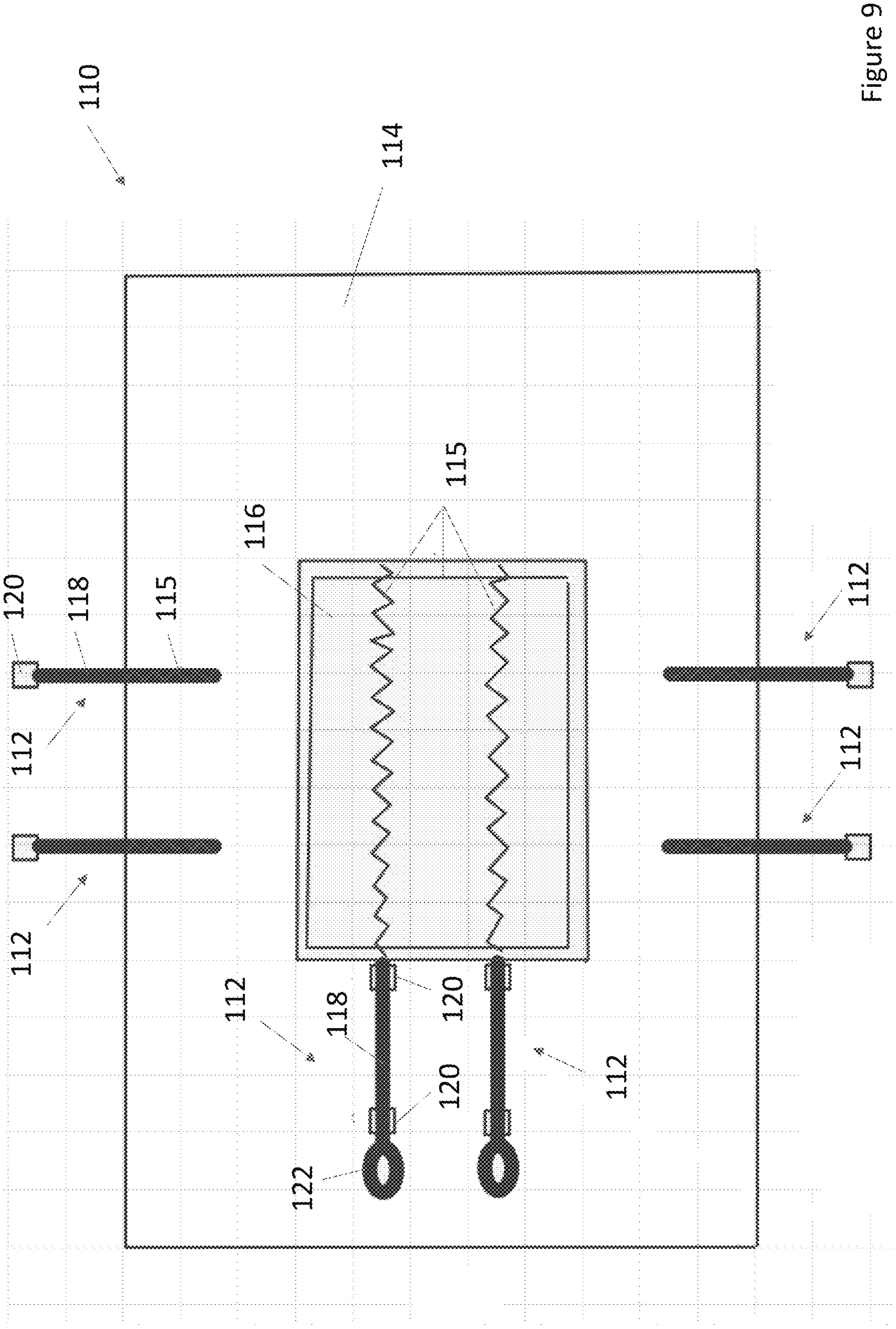
FIG. 9 is a simplified bottom plan view of another exemplary embodiment of the ground catch with ruggedization.
Figure 10:
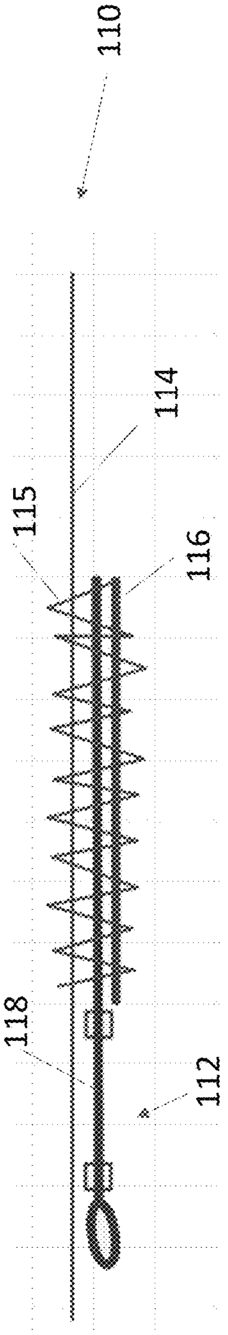
FIG. 10 is a simplified side, partially exploded, elevation view of the ground catch of FIG. 9.
Figure 11:
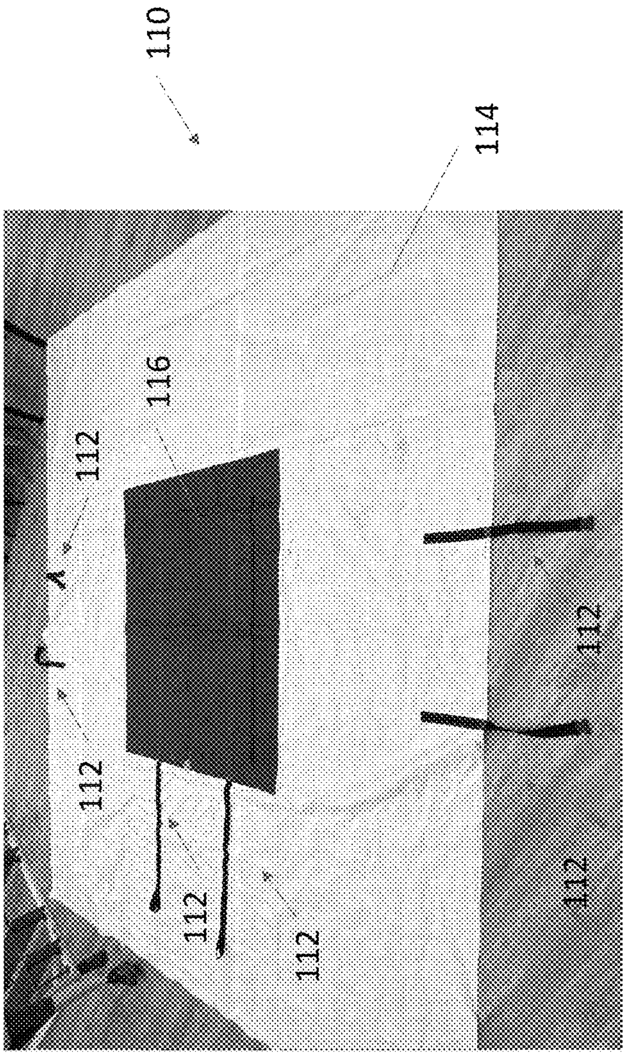
FIG. 11 is a perspective view of another exemplary embodiment of the ground catch with ruggedization.
Figure 13:
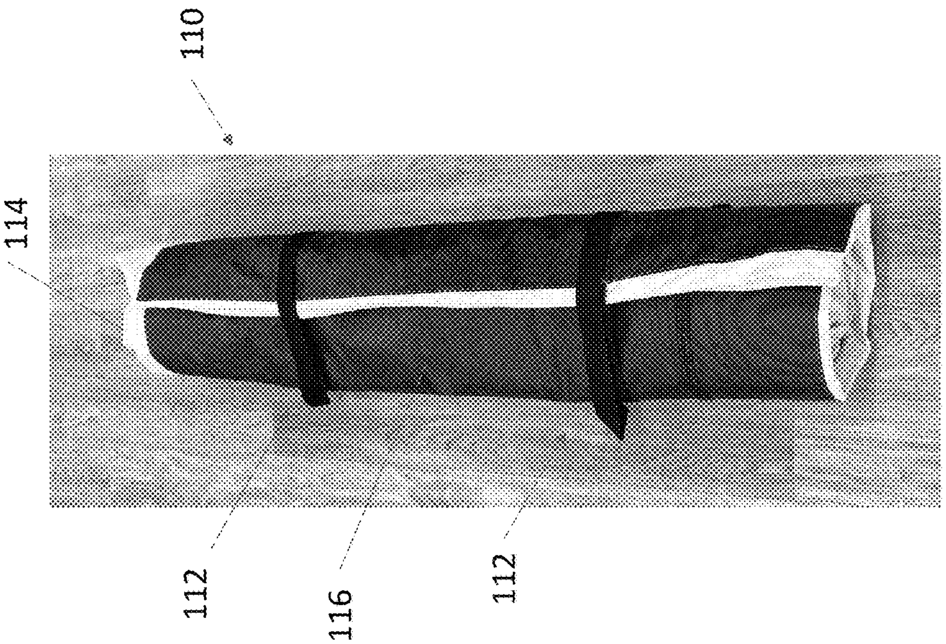
FIG. 13 is a perspective view of the ground catch of FIG. 11 rolled and secured for storage.
Figure 12:
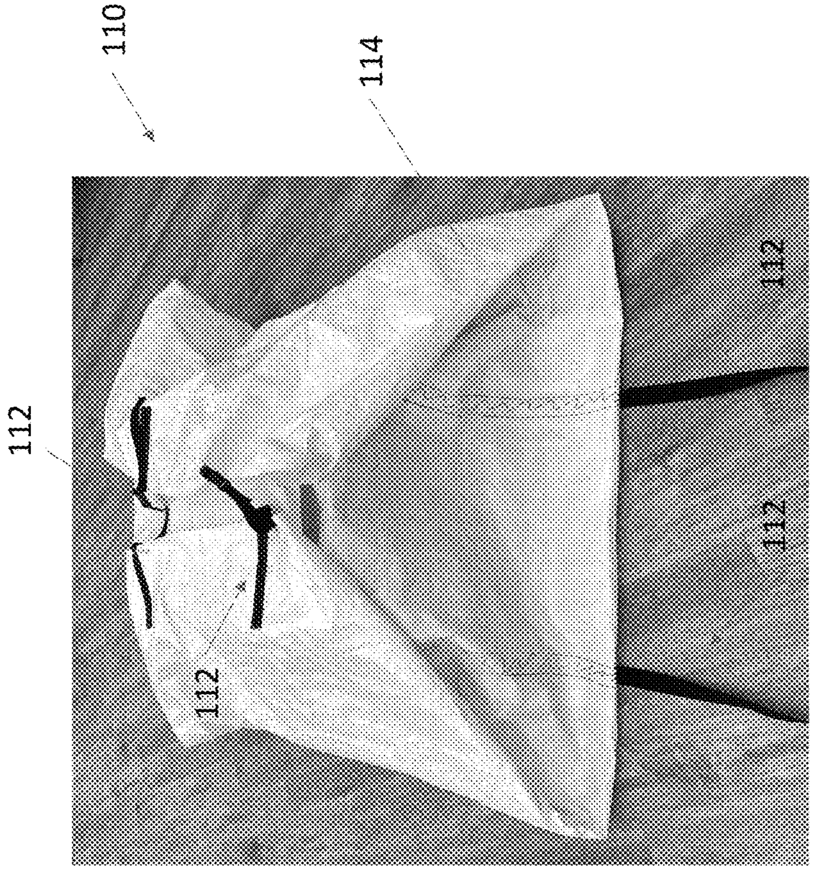
FIG. 12 is a perspective view of the ground catch of FIG. 11 secured about exemplary materials.

FIG. 5 illustrates the skid 16A shown from the side in isolation. The skid 16A may comprise a substantially square or rectangular cross section, such as to form a substantially cuboid shaped member.

FIG. 6 illustrates the skid 16B shown from the side in isolation. The skid 16B may comprise multiple sections 18A, 18B with a connector 20 therebetween. The connector 20 may permit hinging movement of the sections 18 relative to one another. The connector 20 may comprise a relatively flexible material and/or a smaller cross-sectional area to permit movement of the sections 18 relative to one another, by way of non-limiting example. Any number of sections 18 and connectors 20 may be utilized.

FIG. 7 illustrates the skid 16C shown from the side in isolation. The plate or panel may comprise a curved lower surface. This may provide a curved or ramped surface for ease of passing the ground catch 10 over uneven or rough surfaces. The upper surface may be substantially flat and/or curved or ramped.

FIG. 8 illustrates the skid 16D shown from the side in isolation. The skid 16D may comprise a ramped and/or curved lower surface. The upper surface may be substantially flat and/or curved or ramped. For example, a depression may be provided at a mid-portion of the skid 16D. This may cause the primary catch area 14 to take on a naturally concave shape, such as to assist with retaining captured debris.

Any number, type, and/or arrangement of the skids 16 (16A-16D) may be utilized. Any size, shape, and/or type of primary catch area 14 of any type or kind of material may be utilized. Any number, type, and/or arrangement of the handles 12 may be utilized. The skids 16 may utilize rounded corners or edges, though such is not required.

The skids 16 may comprise plastic and/or metal, by way of non-limiting example. The skids 16 may be attached to the primary catch area 14 in a permanent fashion, such as by adhesive and/or sewing, by way of non-limiting example.

One or more such ground catches 10 of the same or different type may be provided at a job site. In exemplary embodiments, without limitation, such ground catches 10 may be provided in connection with, or adjacent to, a debris collection system using some or all of the components or techniques provided in US Pub. No. 2020/0354959 published Nov. 12, 2020, the contents of which are hereby incorporated by reference as if fully restated herein, by way of non-limiting example.

The ground catches 10 may be placed adjacent to a structure being worked on. Construction debris, such as but not limited to roofing debris (e.g., shingles, fasteners, flashing, sealant, and the like) may be deposited at the ground catches 10, such as directly and/or by way of one or more debris collection components. The collected debris may be transported, such as by manually dragging the ground catches 10 by way of the handles 12, to a dumpster or other location at the job site for disposal or other disposition. The ground catches 10 may be partially folded during transportation in exemplary embodiments, such as to retain the debris, though such is not required. After dispositioning the debris, the ground catches 10 may optionally be reused at other job sides. The ground catches 10 may be folded for storage or transportation.

FIG. 9 through FIG. 13 illustrate another exemplary embodiment of the ground catch 110. The ground catch 110 may comprise a primary catch area 114, which may by relatively flexible, such as for folding and/or rolling. The primary catch area 114 may comprise, netting, canvas, and/or a tarpaulin material, though other type and/or kinds of materials may be utilized. A ruggedized portion 116 may be provided over some or all of the primary catch area 114. The ruggedized portion 116 may comprise one or more additional layers of material, such as of the same or different type from the primary catch area 114. The ruggedized portion 116 may provide a form of skid protection and may be provided as an alternative to, or in addition to, the skid protectors 16.

Preferably, the ruggedized portion 116 is provided at a central portion of the primary catch area 114, though other locations may be utilized. In exemplary embodiments, without limitation, the ruggedized portion 116 may be attached to the primary catch area 114, such as by way of stitching 115. Preferably, the stitching 115 is provided about a perimeter of the ruggedized portion 116. However, any type, kind, and/or location of the stitching 115 may be utilized. In other exemplary embodiments, other attachments techniques may be utilized, such as fastening, heat welding, adhesive, or the like.

The ruggedized portion 116 may be of the same or different material as the primary catch area 114. In exemplary embodiments, without limitation, the ruggedized portion 116 is thicker than the primary catch area 114, though such is not necessarily required. Preferably, the primary catch area 114 is substantially rectangular in shape and the ruggedization portion is substantially square or rectangular in shape. In exemplary embodiments, without limitation, the primary catch area 114 is approximately 17 feet by 13 feet and the ruggedized portion 116 is approximately 7 feet by 5 feet. However, those of skill in the art will recognize that the primary and/or ruggedization portion 114, 116 may be any size and/or shape.

The ground catch 110 may comprise a number of straps 112. Each of the straps 112 may comprise webbing 118. Each of the straps 112 may comprise at least one buckle component 120 (e.g., male and/or female portion). Some or all of the straps 112 may comprise handles 122. The straps 112 may be connected to the primary catch area 114 and/or the ruggedized portion 116 by way of stitching 115. Preferably, the stitching 115 is provided along a portion of the webbing 118. In other exemplary embodiments, other attachments techniques may be utilized, such as fastening, heat welding, adhesive, or the like.

In exemplary embodiments, without limitation, a first and second set of one or more of the straps 112 may be provided at a first and second opposing sides of the primary catch area 114. The first and second set of the straps 112 may comprise complementary male and female buckle components 120, respectively, for mating, such as when the ground catch 110 is folded. Preferably, the strap(s) 112 on a first side of the primary catch area 114 (e.g., the first set of one or more straps 112) may comprise male buckle components 120 while the strap(s) 112 on a second side of the primary catch area 114 (e.g., the second set of one or more straps 112) may comprise female buckle components 120, or vice-versa. In this fashion, material may be deposited at the primary catch area 114, preferably at a centralized area thereof, and the primary catch area 114 is folded about the material and the first and second set of one or more straps 112 are secured to one another (e.g., FIG. 12). In exemplary embodiments, without limitation, a portion of the webbing 118 of the first and second set of one or more straps 112 may be stitched or otherwise secured to the primary catch area 114 while a remaining portion extends beyond a perimeter of the primary catch area 114 when the ground catch 110 is laid flat and is otherwise unsecured.

A third set of one or more of the straps 112 may be provided at a side portion of the primary catch area 114. The strap(s) 112 in the third set may extend between the primary catch area 114 and the ruggedized portion 116 in exemplary embodiments. The third set of straps 112 may comprise spaced apart male and female buckle components 120 on each of the straps 112 for mating when the ground catch 110 is rolled, for example. In this way, the third set of straps 112 may connect to themselves or to each other. The third set of straps 112 may also include loop style grab handles 122, though any of the straps 112 may include grab handles 122 of any kind. In exemplary embodiments, without limitation, a portion of the webbing 118 of the third set of one or more straps 112 may be stitched to the ruggedized portion 116 while a remaining portion extends beyond a perimeter of the ruggedized portion 116, but preferably within the primary catch area 114 when the ground catch 110 is laid flat so that they remain otherwise unsecured.

Preferably, the stitching 115 for the third set of strap(s) 112 extends into both the primary and ruggedization portions 114, 116. The webbing 118 of the third set of strap(s) 112 may extend across the entirety or substantially all of (e.g., at least 90%) a length of the ruggedized portion 116. In this fashion, the stitching 115 may reinforce the ground catch 110.

In exemplary embodiments, without limitation, each of the straps 112 in the first and second set of the straps 112 comprise 36-inch-long lengths of the webbing 118, approximately 18 inches of which are sewn to the primary catch area 114 and approximately 18 inches of which extend beyond the perimeter of the primary catch area 114 and are otherwise unattached. Approximately may include within (+/−) 10% of the stated value. The straps 112 in the third set of straps 112 may comprise approximately 11 feet length of webbing 118, including any (optional) grab handles 120, approximately 7 feet of which are sewn to the primary and/or ruggedized portions 114, 116 and approximately 4 feet of which extend beyond the perimeter of the ruggedized portion 116 and are otherwise unattached. The webbing 118 may comprise flat webbing of approximately 2 inches in width. The grab handles 120 may comprise portions of the webbing 118 which are secured in a loop, though any type or kind of handle 120 may be utilized. The grab handles 120 may be approximately 8 inches long. The dimension, material, sizes, components, and/or arrangements shown and/or described herein are merely exemplary and not intended to be limiting.

Any number, size, arrangement, and/or type of straps 112 may be provided at any location at the ground catch 110. The ground catch 110 may be folded in various ways to secure various size and/or shape materials. The ground catch 110 may preferably be rolled for compact storage (e.g., FIG. 13). The ground catch 110 may comprise holders for excess webbing 118 in exemplary embodiments, without limitation.

The ruggedized portion 116 and/or the stitching 115 may increase ruggedness of the ground catch 110, such as for transporting material across ground surfaces.

Figure 14:
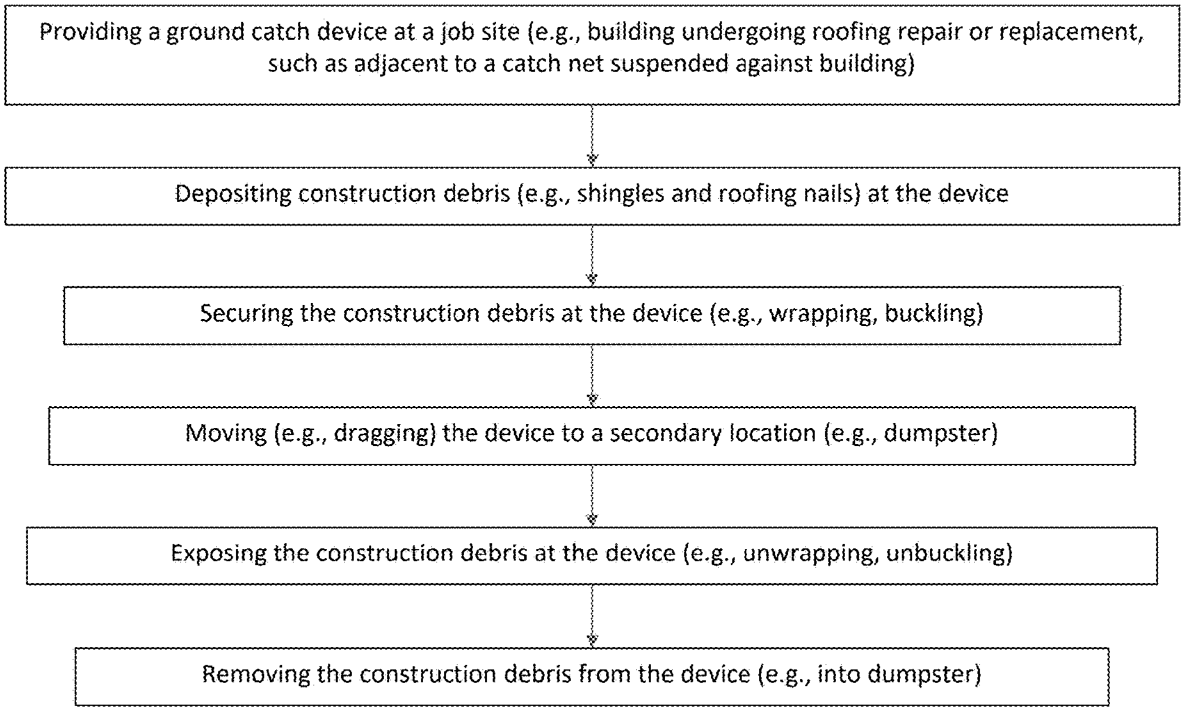
FIG. 14 is a flow chart with an exemplary method for using the ground catch of FIG. 1-12.

FIG. 14 illustrates an exemplary method for using the ground catch 10, 110. The ground catch 10, 110 may be provided at a job site, such as building undergoing roofing repair or replacement, by way of non-limiting example. For example, without limitation, the ground catch 10, 110 may be positioned adjacent to a catch net suspended against such a building. Construction debris, such as but not necessarily limited to shingles and roofing nails, may be deposited into the ground catch 10, 110. The construction debris may be secured at the ground catch 10, 110, such as by wrapping the ground catch 10, 110 about the debris and/or buckling the straps 112 in exemplary embodiment, without limitation. The ground catch 10, 110 may be moved to a secondary location, such as adjacent to a dumpster. Movement may be made by way of dragging the ground catch 10, 110, such as by the grab handles 120. The construction debris may be exposed, such as by unbuckling and/or unwrapping. The construction debris may be removed from the ground catch 10, 110, such as by depositing the construction debris into the dumpster. Other steps shown and/or described herein may be implemented. The steps shown and/or described herein may be optional and may be performed in various order, omitted, repeated, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A ruggedized material collection device, said device comprising:
- a primary catch area defining a perimeter;
- a ruggedized portion provided along a bottom surface of the primary catch area and located wholly within the perimeter; and
- a plurality of straps, each comprising webbing attached to the primary catch area by stitching and at least some of which extend beyond the perimeter of the primary catch area when the device is laid flat, wherein:
  - a first set of one or more of the straps are located at a first side of the primary catch area, comprise a male buckle component, and extend beyond the perimeter of the primary catch area when the device is laid flat;
  - a second set of one or more of the straps are located at a second side of the primary catch area opposing the first side, comprise a female buckle component, and extend beyond the perimeter of the primary catch area when the device is laid flat;
  - a third set of one or more of the straps are located at a third side of the primary catch area, comprise a grab handle, a male buckle component, and a female buckle component spaced apart from one another along the webbing, wherein each of the third set of one or more of the straps are stitched to both the primary catch area and the ruggedized portion, and extend along a length of the ruggedized portion and wholly within the perimeter of the primary catch area when the device is laid flat.

2. The device of claim 1 wherein:
- each of the first, second, and third set of one or more straps comprise multiple ones of the straps; and
- the primary catch area and the ruggedized portion each comprise a rectangular shape.

3. The device of claim 1 wherein:
- the primary catch area and the ruggedized portion each comprise tarpaulin.

4. The device of claim 1 wherein:
- the ruggedized portion comprises at least one skid comprising at least one elongate member extending along a portion of the primary catch area.

5. A ruggedized material collection device, said device comprising:
- a primary catch area defining a perimeter;
- a ruggedized portion provided along a bottom surface of the primary catch area and located wholly within the perimeter; and
- a plurality of straps, each comprising a buckle component and webbing stitched to the primary catch area, said plurality of straps comprising:
  - a first set of one or more of the straps provided at a first side of the primary catch area and extending beyond the perimeter of the primary catch area when the device is laid flat;
  - a second set of one or more of the straps located at a second side of the primary catch area opposing the first side, and extending beyond the perimeter of the primary catch area when the device is laid flat, wherein the buckle components of the second set of one or more straps are configured to mate with the buckle components of the first set of one or more straps; and
  - a third set of one or more of the straps located at a third side of the primary catch area and extending along at least part of the ruggedized portion and part of the primary catch area such that the third set of one or more of the straps each terminate within the perimeter of the primary catch area when the device is laid flat, wherein the third set of one or more straps extend longitudinally transverse to a longitudinal axis of each of the straps in the first and second sets of one or more straps and configured to mate with one another.

6. The ruggedized material collection device of claim 5 wherein:
- none of the plurality of straps overlap when the device is laid flat; and
- none of the plurality of straps intersect when the device is laid flat.

7. The ruggedized material collection device of claim 6 wherein:
- the primary catch area and the ruggedized portion comprise a layer of tarpaulin.

8. The ruggedized material collection device of claim 7 wherein:
- the third set of one or more of the straps are each stitched to both the primary catch area and the ruggedized portion.

9. The ruggedized material collection device of claim 8 wherein:

the third set of one or more straps each comprise one of the grab handles.

10. The ruggedized material collection device of claim 9 wherein:

the grab handles comprise looped portions of the webbing.

11. A method for collecting construction debris at a job site, said method comprising:

providing, at the job site, a ground catch device comprising:

a primary catch area defining a perimeter;

a ruggedized portion located wholly within the perimeter; and a plurality of straps, each attached to the primary catch area and comprising webbing and at least one buckle component attached to said webbing, wherein at least some of the straps extend beyond the perimeter when the device is laid flat, and wherein at least some of the straps comprise a grab handle;

laying the device flat at a first location of the job site;

depositing the construction debris into the device;

wrapping the primary catch area about the construction debris;

securing the buckle components of the straps to one another to secure the primary catch area about the construction debris;

moving the device to a secondary location;

unbuckling the buckle components of the straps;

unwrapping the primary catch area to expose the construction debris; and removing the construction debris from the device.

12. The method of claim 11 wherein:

the secondary location comprises a dumpster at the job site; and the step of removing the construction debris from the device comprises dumping the construction debris into the dumpster.

13. The method of claim 12 wherein:

the job site comprises a building undergoing roofing repair or replacement; and the construction debris comprises roofing debris including shingles and roofing nails.

14. The method of claim 13 wherein:

the first location is located adjacent to a catch net suspended adjacent to the building.

15. The method of claim 11 wherein:

the plurality of straps comprise:

a first set of straps located at a first side of the primary catch area and comprising a male buckle component;

a second set of straps located at a second side of the primary catch area opposing the first side and comprising a female buckle component; and a third set of straps located at a third side of the primary catch area and comprising a male buckle component and a female buckle component spaced apart from one another, wherein each of the straps in the third set of straps are stitched to both the primary catch area and the ruggedized portion, wherein the third set of straps each extend along the ruggedized portion and remain wholly within the perimeter of the primary catch area when the device is laid flat, and the third set of straps each comprise one of the grab handles;

the steps of wrapping the primary catch area about the material and securing the buckle components of the straps to one another to secure the primary catch area about the material comprise folding portions of the primary catch area towards one another to bring the first and second sides closer to one another and securing the male buckle component of the first set of straps to the female buckle component of the second set of straps and securing the male; and the step of moving the ground catch to the secondary location comprises dragging the ground catch by the grab handles of the third set of straps.

16. The method of claim 15 further comprising:

rolling the primary catch area such that the third set of straps are securable about the primary catch area by mating the male and female buckle components; and securing the male and female buckle components of the third set of straps.

17. The method of claim 16 wherein:

the primary catch area and the ruggedized portion each comprise tarpaulin;

the ruggedized portion has a larger thickness than the primary catch area; and the primary catch area and the ruggedized portion each define a rectangular shape.

18. The method of claim 15 wherein:

the third set of straps are stitched to both the primary catch area and the rigidized portion.

* * * * *